(12) United States Patent
Comeau et al.

(10) Patent No.: US 6,667,842 B2
(45) Date of Patent: Dec. 23, 2003

(54) NEGATIVE FEEDBACK IMPEDANCE MATCHED PREAMPLIFIER

(75) Inventors: Jonathan P. Comeau, Minneapolis, MN (US); Ronen Malka, Eden Prairie, MN (US); David J. Fitzgerald, Inver Grove Heights, MN (US); Sally A. Doherty, Minneapolis, MN (US)

(73) Assignee: Agere Systems, Inc., Allentown, PA (US)

( * ) Notice: Subject to any disclaimer, the term of this patent is extended or adjusted under 35 U.S.C. 154(b) by 313 days.

(21) Appl. No.: 09/797,316

(22) Filed: Mar. 1, 2001

(65) Prior Publication Data

US 2002/0154435 A1 Oct. 24, 2002

(51) Int. Cl.$^7$ ................................................. G11B 5/02
(52) U.S. Cl. ............................. 360/67; 360/46; 360/68; 330/252; 330/260
(58) Field of Search ........................... 360/67, 110, 46, 360/63, 128, 65, 66, 68; 330/260, 311, 252

(56) References Cited

U.S. PATENT DOCUMENTS

| | | | |
|---|---|---|---|
| 4,366,446 A | * | 12/1982 | Henderson et al. ......... 330/260 |
| 4,706,138 A | * | 11/1987 | Jove et al. ................... 360/67 |
| 5,867,062 A | * | 2/1999 | Kudou ..................... 330/124 R |
| 5,883,767 A | * | 3/1999 | Coffey et al. ................ 360/128 |
| 6,046,876 A | * | 4/2000 | Osafune et al. ................ 360/67 |
| 2002/0131193 A1 | * | 9/2002 | Choi ............................ 360/67 |

FOREIGN PATENT DOCUMENTS

GB 2351195 A * 12/2000 ............. H03F/1/26

OTHER PUBLICATIONS

Howard W. Johnson and Martin Graham, "*High-Speed Digital Design*", 1993, p. 161, Prentice Hall PTR, New Jersey.

* cited by examiner

*Primary Examiner*—David Hudspeth
*Assistant Examiner*—Natalia Figueroa
(74) *Attorney, Agent, or Firm*—Kinney & Lange, P.A.

(57) ABSTRACT

A preamplifier system is provided for connection through an interconnect to a read head. The interconnect has a characteristic impedance associated therewith. The preamplifier system includes an amplifier circuit having an input for connection to the interconnect. The amplifier circuit amplifies an input signal carried from the read head through the interconnect, yielding an amplified input output signal. A feedback resistance is connected between the amplified output signal and the input of the amplifier circuit. The feedback resistance has a value selected to provide an effective input impedance of the preamplifier system to match the characteristic impedance of the interconnect.

25 Claims, 6 Drawing Sheets

NEGATIVE FEEDBACK IMPEDANCE MATCHED PREAMPLIFIER

BACKGROUND OF THE INVENTION

The present invention relates to a read system for reading information from a magnetic storage medium using a magnetoresistive head and for providing an output signal representative of the information read. In particular, the present invention relates to a read system employing a negative feedback impedance matched preamplifier for improved bandwidth and noise performance.

A popular method of magnetic data storage utilizes magnetoresistive (MR) heads to recover data from a magnetic data storage medium such as a magnetic disk. An MR head employs an MR element that changes in resistivity with changing magnetic flux from data patterns on an adjacent magnetic disk surface. A bias current having a constant value is passed through the MR element, or a bias voltage having a constant value is applied across the MR element, and the change in resistivity is measured by sensing a change in voltage across the MR head. The change in voltage is detected by the preamplifier circuit for manipulation and analysis, so that the data recorded on the disk may be accurately recovered.

Preamplifier circuits have certain frequency response and noise performance characteristics. These characteristics and others determine the usefulness of the amplifier circuit in any given application. The band of frequencies over which the gain of the amplifier circuit is almost constant is called the bandwidth. Signals whose frequencies are outside the bandwidth will experience lower gain, with the gain decreasing as the frequencies of the signals become further removed from the bandwidth. The preamplifier circuit is only effective for input signal frequencies within its bandwidth, since input signals having a range of frequencies outside of the preamplifier bandwidth would be distorted, with different frequency components of the input signal being amplified by different amounts. As data continues to be recorded at higher and higher frequencies in order to store a greater amount of data on a fixed medium, higher frequency bandwidth is desirable.

Noise performance can be a limiting factor on the effective bandwidth of a preamplifier circuit. The preamplifier circuit is typically connected to the MR head through a flex cable, which acts as a simple transmission line. At high frequencies, the transmission line can cause signal reflections that distort the output signal and reduce the signal-to-noise ratio (SNR) of the preamplifier circuit. These reflections can be reduced or eliminated by either impedance matching the MR head to the transmission line and/or by impedance matching the preamplifier circuit to the transmission line. Since the resistance of the MR head can vary significantly between head designs, it is not feasible to precisely match the impedance of the MR head to the impedance of the transmission line. Thus, the practical approach for noise reduction and improved bandwidth is to match the impedance of the preamplifier circuit to the impedance of the transmission line.

Prior attempts to match the impedance of the preamplifier circuit to the impedance of the transmission line have involved employing a shunt matching resistor located across the input nodes of the preamplifier circuit, effectively in parallel with the input impedance of the preamplifier circuit. This configuration allows the characteristic impedance of the preamplifier circuit to be reduced to match the impedance of the transmission line. As a result of this impedance matching, the high frequency reflections that could distort the output signal from the preamplifier circuit are reduced, therefore increasing the undistorted bandwidth of the preamplifier circuit. However, there is a large passband noise penalty incurred by the use of the shunt matching resistor, which may not be acceptable for high performance disk drives or other applications.

There is a need in the art for a preamplifier circuit that is impedance matched to the transmission line connecting the preamplifier circuit to the MR head in such a manner as to improve the bandwidth of the preamplifier circuit while maintaining acceptable noise performance.

BRIEF SUMMARY OF THE INVENTION

The present invention is an impedance matched preamplifier system for connection through an interconnect to a read head. The interconnect has a characteristic impedance associated therewith. The preamplifier system includes an amplifier circuit having an input for connection to the interconnect (or to the head, in one embodiment). The amplifier circuit amplifies an input signal carried from the read head through the interconnect, yielding an amplified output signal. A feedback resistance is connected between the amplified output signal and the input of the amplifier circuit. The feedback resistance has a value selected to provide an effective input impedance of the preamplifier system to match the characteristic impedance of the interconnect.

DETAILED DESCRIPTION

Figure 1:
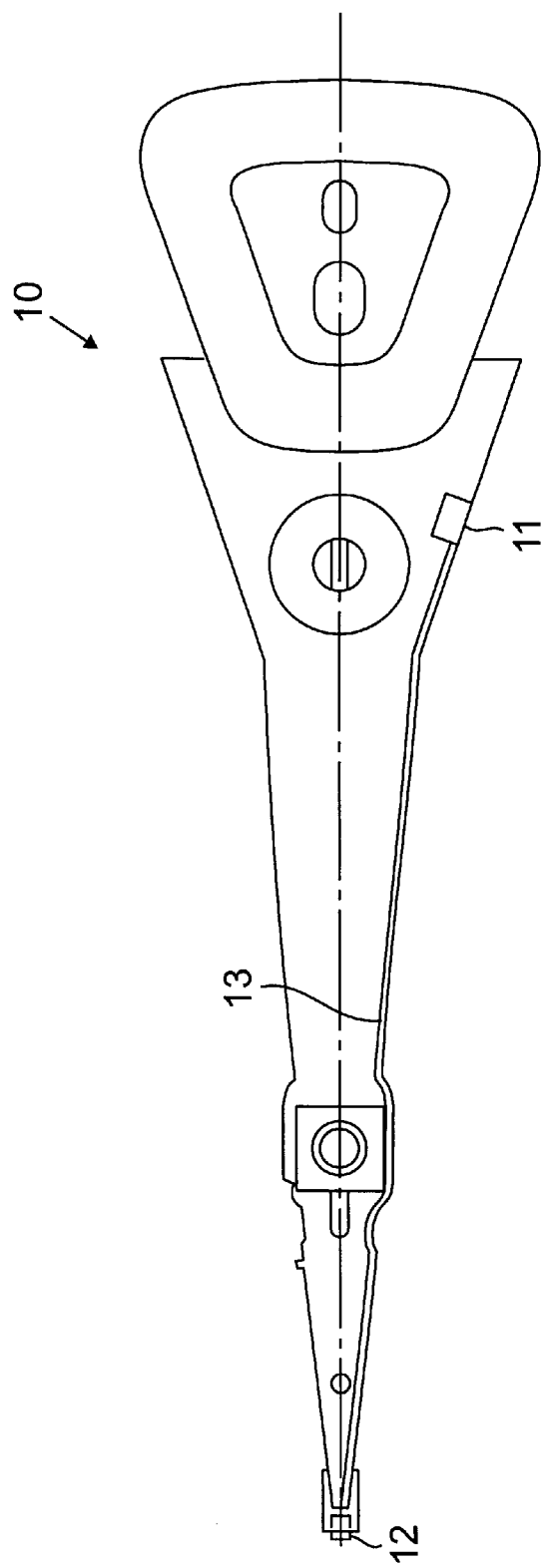
FIG. 1 is a diagram illustrating a typical disk drive arm.

FIG. 1 is a diagram illustrating typical disk drive arm 10. Disk drive arm 10 includes preamplifier 11 operatively connected to read head 12 by interconnect 13. Interconnect 13 is typically about two inches long. Read head 12 is typically an MR element having a resistance of about 30Ω to about 80Ω for giant magnetoresistive (GMR) heads and about 100Ω to about 500Ω for tunneling magnetoresistive (TMR) heads. Interconnect 13 typically has a characteristic impedance of about 100Ω, which is not necessarily well matched with read head 12. It is desirable to impedance match preamplifier 11 to interconnect 13, in a manner that does not incur an unacceptable increase in noise that would degrade the performance of preamplifier 11.

Figure 2A:
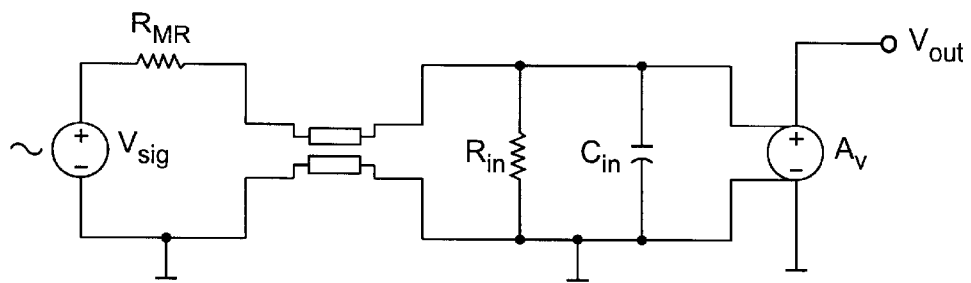
FIG. 2A is a schematic diagram of a circuit modeling the performance of a first prior art disk drive preamplifier that is not impedance-matched.

FIG. 2A is a schematic diagram of a circuit modeling the performance of a first prior art disk drive preamplifier that is not impedance-matched. The signal present on the MR element (as recovered from the disk) is modeled as a time-varying voltage source $V_{sig}$, and the resistance of the MR element itself if modeled as a resistor $R_{MR}$. The interconnect connecting the MR element to the preamplifier circuit is modeled as a simple transmission line. The preamplifier circuit itself is modeled as having an input impedance $R_{in}$, an input capacitance $C_{in}$ and an inverting gain $A_V$, yielding an output signal $V_{out}$. The preamplifier circuit of FIG. 2A is an example of a typical, non-impedance-matched preamplifier, since the input impedance $R_{in}$ and input capacitance $C_{in}$ in parallel does not match the characteristic impedance of the transmission line. As a result, the transmission line will produce reflections at high frequencies that distort the output signal $V_{out}$ from the preamplifier and therefore hinder the signal-to-noise ratio (SNR) of the preamplifier.

Figure 2B:
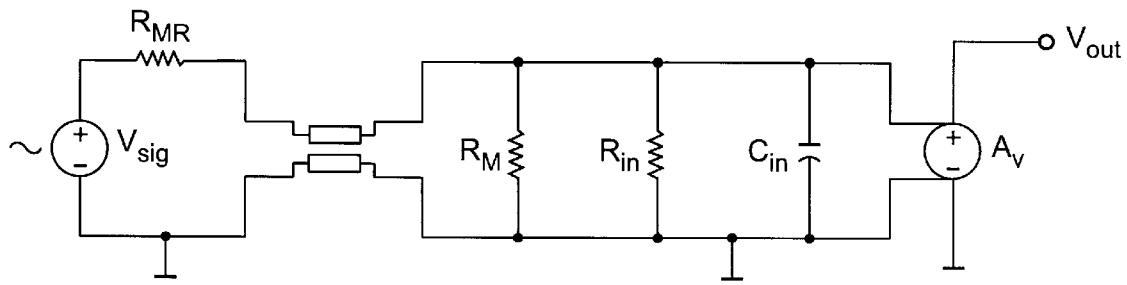
FIG. 2B is a schematic diagram of a circuit modeling the performance of a second prior art disk drive preamplifier that is impedance-matched by employing a shunt matching resistor.

FIG. 2B is a schematic diagram of a circuit modeling the performance of a second prior art disk drive preamplifier that is impedance-matched by employing shunt matching resistor $R_M$. The circuit of FIG. 2B is modeled in the same manner as the circuit of FIG. 2A, with the addition of the shunt matching resistor $R_M$. Shunt matching resistor $R_M$ is selected with a resistance such that the input impedance $R_{in}$ and input capacitance $C_{in}$ of the preamplifier in parallel with shunt matching resistor $R_M$ matches the characteristic impedance of the interconnect. Employing shunt matching resistor $R_M$ reduces the high frequency reflections that would tend to distort the output signal $V_{out}$. However, a large noise penalty is incurred by introducing shunt matching resistor $R_M$, rendering the performance of the preamplifier unacceptable for most disk drive applications.

Figure 2C:
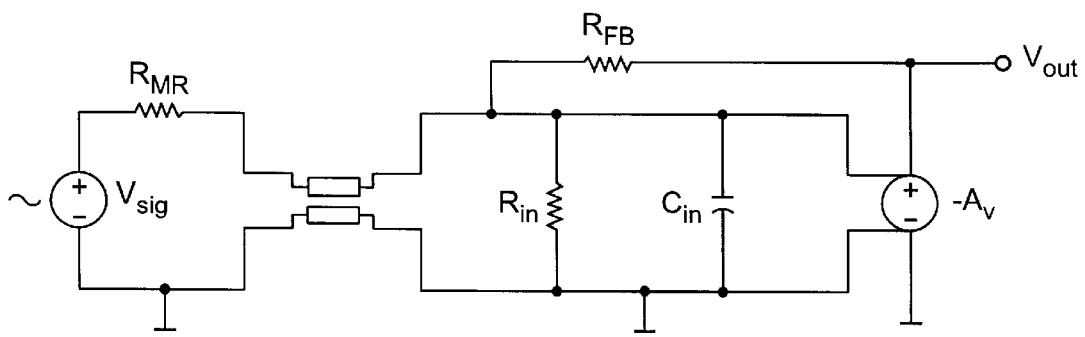
FIG. 2C is a schematic diagram of a circuit modeling the performance of an impedance-matched feedback terminated preamplifier according to the present invention.

FIG. 2C is a schematic diagram of a circuit modeling the performance of an impedance-matched feedback terminated preamplifier according to the present invention. The circuit of FIG. 2C is modeled in the same manner as the circuit of FIG. 2A, with the addition of feedback resistor $R_{FB}$ connected in a negative feedback configuration. The preamplifier system includes an amplifier circuit for connection to the interconnect to amplify the input signal carried from the read head through the interconnect to yield amplified output signal $V_{out}$ with an inverting gain of $A_V$, and also includes feedback resistor $R_{FB}$ connected between the output signal $V_{out}$ and the interconnect. Feedback resistor $R_{FB}$ is selected with a resistance that reduces the total impedance looking into the preamplifier, so that the impedance looking into the preamplifier matches the characteristic impedance of the interconnect. It should be understood that the feedback resistance of the present invention is shown as resistor $R_{FB}$ in an exemplary embodiment, but that the invention is equally applicable for other elements and devices providing the feedback resistance for impedance matching to the interconnect. The impedance looking into the preamplifier, assuming that the input impedance $R_{in}$ of the preamplifier is much greater than $R_{FB}/A_V$ and that $A_V$ is much greater than 1, is defined as follows:

$$R_{preamp} = \frac{R_{FB}/A_V}{1 + \frac{(sC_m)(R_{FB})}{A_V}} \qquad (\text{Eq. 1})$$

Due to the impedance matching achieved by the feedback terminated preamplifier shown in FIG. 2C, high frequency reflections that would tend to distort the amplified output signal $V_{out}$ are reduced. In addition, employing feedback resistor $R_{FB}$ to match the impedance of the interconnect, rather than the shunt matching resistor $R_M$ shown in FIG. 2, provides noise performance that is well within acceptable levels for disk drive applications.

Figure 3:
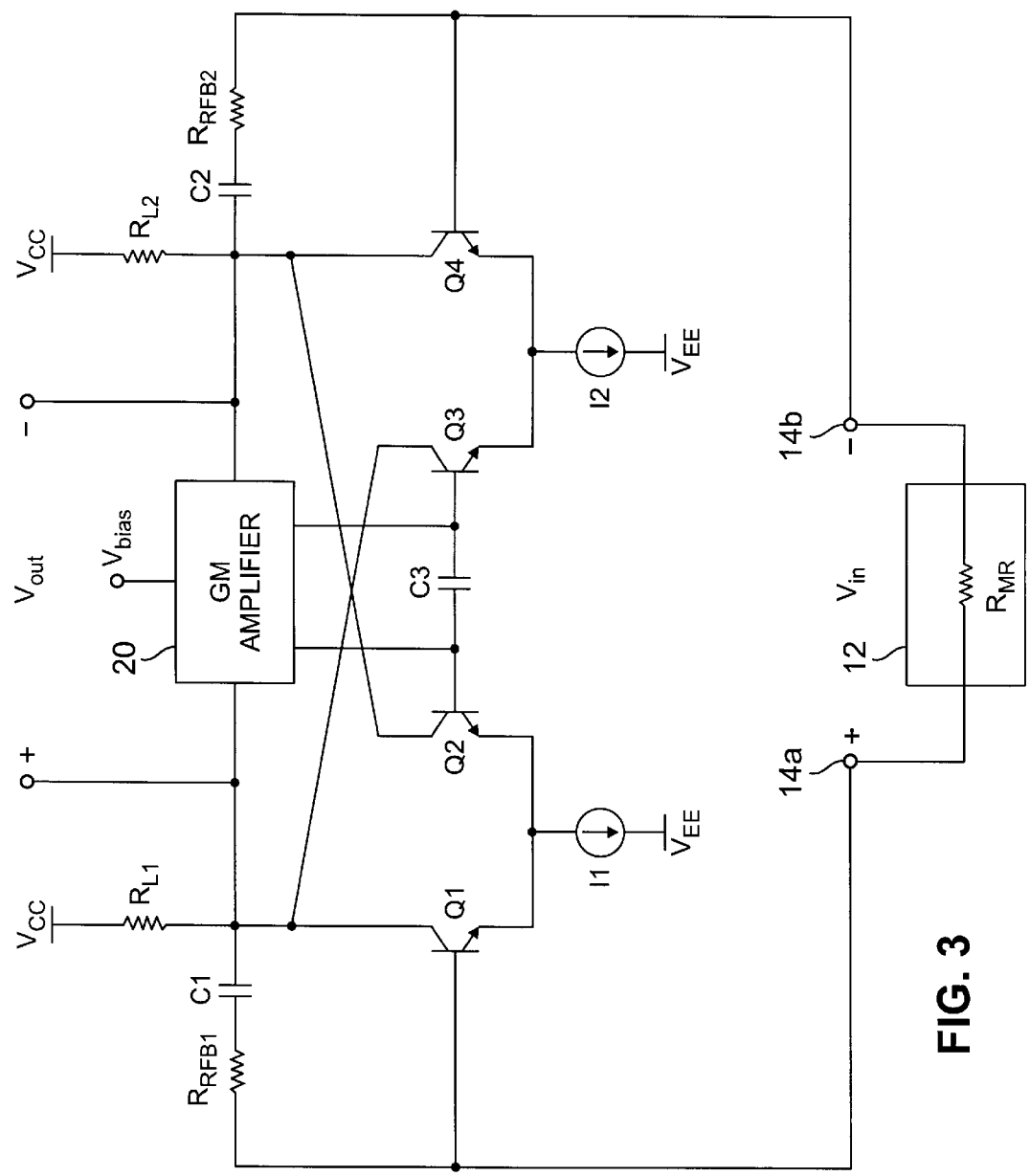
FIG. 3 is a schematic diagram of an exemplary implementation of a differential feedback terminated impedance-matched preamplifier according to the present invention.

FIG. 3 is a schematic diagram of an exemplary implementation of a differential feedback terminated impedance-matched preamplifier according to the present invention. The input signal across read head 12 (shown as resistor $R_{MR}$) is shown as voltage $V_{in}$ between positive terminal 14a and negative terminal 14b. Positive terminal 14a is connected to the base of transistor Q1, which is connected through feedback resistor $R_{FB1}$ and capacitor C1 to the collector of transistor Q1. Negative terminal 14b is connected to the base of transistor Q4, which is connected through feedback resistor $R_{FB2}$ and capacitor C2 to the collector of transistor Q4. The collector of transistor Q1 is connected through load resistor $R_{L1}$ to fixed voltage level $V_{CC}$, and the collector of transistor Q4 is connected through load resistor $R_{L2}$ to fixed voltage level $V_{CC}$. The emitter of transistor Q1 is connected to the emitter of transistor Q2, and both emitters are connected through current source I1 to fixed voltage level $V_{EE}$. The emitter of transistor Q4 is connected to the emitter of transistor Q3, and both emitters are connected through current source I2 to fixed voltage level $V_{EE}$. The bases of transistors Q2 and Q3 are connected together through capacitor C3. The collector of transistor Q2 is connected to the collector of transistor Q4, and the collector of transistor Q3 is connected to the collected of transistor Q1. Transconductance (Gm) amplifier 20 is connected to biasing voltage $V_{bias}$ and to the collectors of transistors Q1 and Q4 and the bases of transistors Q2 and Q3. The amplified output voltage of the system is taken between the collector of transistor Q1 and the collector of transistor Q4.

The differential feedback terminated impedance-matched preamplifier system shown in FIG. 3 includes an inverting amplifier circuit for connection to the interconnect to amplify input signal $V_{in}$ carried from the read head through the interconnect to yield amplified output signal $V_{out}$, and also includes a feedback resistance ($R_{FB1}$ and $R_{FB2}$) connected between the output signal $V_{out}$ and input signal $V_{in}$. Transistors Q1 and Q4 are each connected in a well known common-emitter amplifier arrangement with degeneration, and transistors Q2 and Q3 are each connected in a well known common base amplifier arrangement. These configurations may also be thought of as two differential transistors pairs (Q1–Q2 and Q3–Q4) connected to each other by an AC coupling capacitor, according to another design nomenclature well known in the art. Gm amplifier 20 is connected in a well known manner to bias the amplifiers appropriately for proper operation. Feedback resistors $R_{FB1}$ and $R_{FB2}$, along with DC blocking capacitors C1 and C2, are connected between the output voltage of the system and the input voltage of the system. The addition of these feedback resistors effectively provides an impedance in parallel with the input impedance of the amplifiers employed. This parallel impedance is based on the values of resistors $R_{FB1}$ and $R_{FB2}$ and the overall gain of the amplifiers employed in the system, and operates to reduce the effective impedance of the preamplifier system. Therefore, in order to match the impedance of the preamplifier system to the impedance of the interconnect employed to connect the preamplifier system to read head 12, the amplifiers of the preamplifier system must be designed with an input impedance that is greater than the characteristic impedance of the interconnect. The values of feedback resistors $R_{FB1}$ and $R_{FB2}$ are then chosen to reduce the total effective input impedance to match the characteristic impedance of the interconnect.

Figure 4:
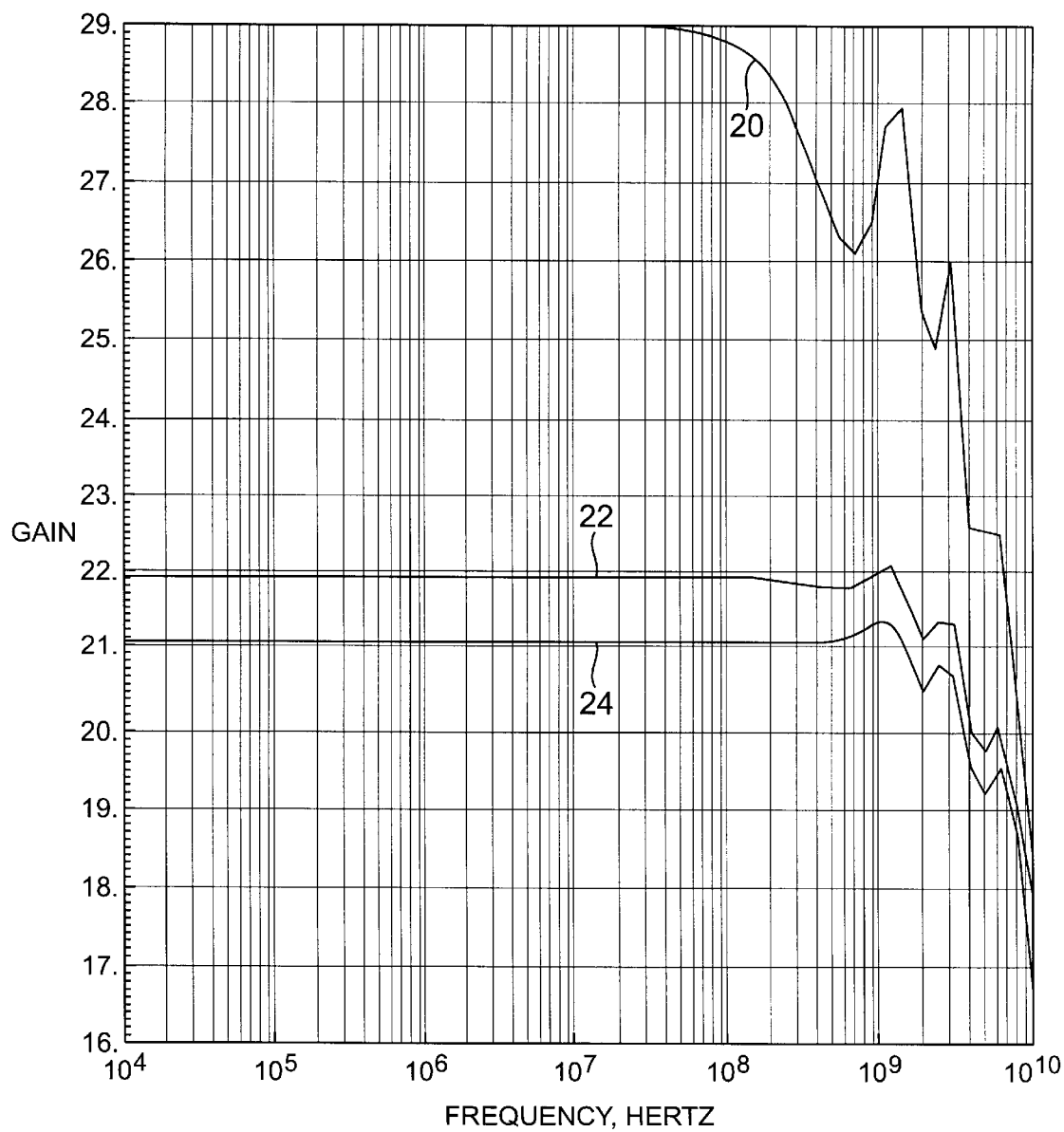
FIG. 4 is a graph showing the relationship of preamplifier gain with frequency for two prior art types of preamplifier systems and for the preamplifier system of the present invention.

FIG. 4 is a graph showing the relationship of preamplifier gain with frequency for two prior art types of preamplifier systems and for the preamplifier system of the present invention. Curve 20 illustrates the preamplifier gain to frequency relationship for a prior art preamplifier system that is not impedance matched to the interconnect, as generally shown in FIG. 2A. Curve 22 illustrates the preamplifier gain to frequency relationship for a prior art preamplifier system employing a shunt matching resistor for impedance matching to the interconnect, as generally shown in FIG. 2B. Curve 24 illustrates the preamplifier gain to frequency relationship for the impedance matched feedback terminated preamplifier system of the present invention, as generally shown in FIG. 2C. The gain response of the prior art non-impedance matched preamplifier, as shown by curve 20, begins to distort at frequencies greater than about 100 mega-Hertz (MHz), due to high frequency reflections cause by the mismatch between the impedances of the interconnect and the preamplifier system. By contrast, impedance matching the preamplifier system to the interconnect, either by shunt matching (curve 22) or by the feedback termination method according to the present invention (curve 24), increases the effective bandwidth of the preamplifier system, achieving consistent gain response to frequencies exceeding about 1 giga-Hertz (GHz), which is a typical resonant frequency of the interconnect.

Figure 5:
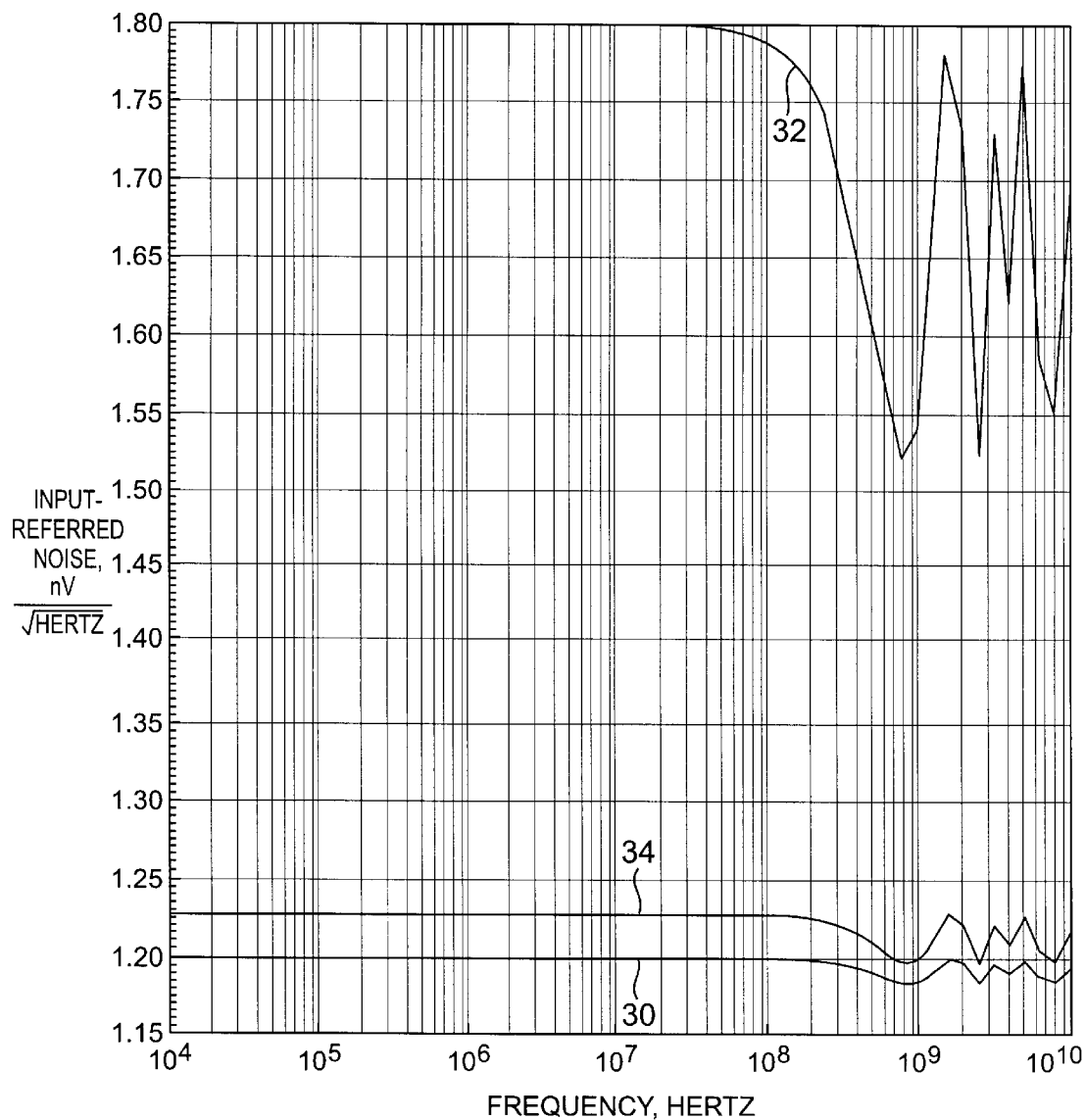
FIG. 5 is a graph showing the relationship of the preamplifier input-referred noise with frequency for two prior art types of preamplifier systems and for the preamplifier system of the present invention.

FIG. 5 is a graph showing the relationship of the preamplifier input-referred noise with frequency for two prior art types of preamplifier systems and for the preamplifier system of the present invention. Curve 30 illustrates the preamplifier input-referred noise to frequency relationship for a prior art preamplifier system that is not impedance matched to the interconnect, as generally shown in FIG. 2A. Curve 32 illustrates the preamplifier input-referred noise to frequency relationship for a prior art preamplifier system employing a shunt matching resistor for impedance matching to the interconnect, as generally shown in FIG. 2B. Curve 34 illustrates the preamplifier input-referred noise to frequency relationship for the impedance matched feedback terminated preamplifier system of the present invention, as generally shown in FIG. 2C. Input-referred noise is a quantity well known in the art for measuring the performance of amplifiers, determined by dividing the output noise of the amplifier by the gain of the amplifier. The baseline input-referred noise of a preamplifier system is shown by curve 30, which employs no additional components to impedance match the preamplifier to the interconnect. Employing a shunt matching resistor to impedance match the preamplifier to the interconnect, as shown by curve 32, increases the input-referred noise over the passband of frequencies (below about 1 GHz) by about 50%, which is typically an unacceptable level of noise for high performance disk drives. By contrast, impedance matching the preamplifier to the interconnect with negative feedback in the manner of the present invention, as shown by curve 34, results in only a modest increase in the input-referred noise of the preamplifier system, well within acceptable levels for high performance disk drives.

Figure 6:
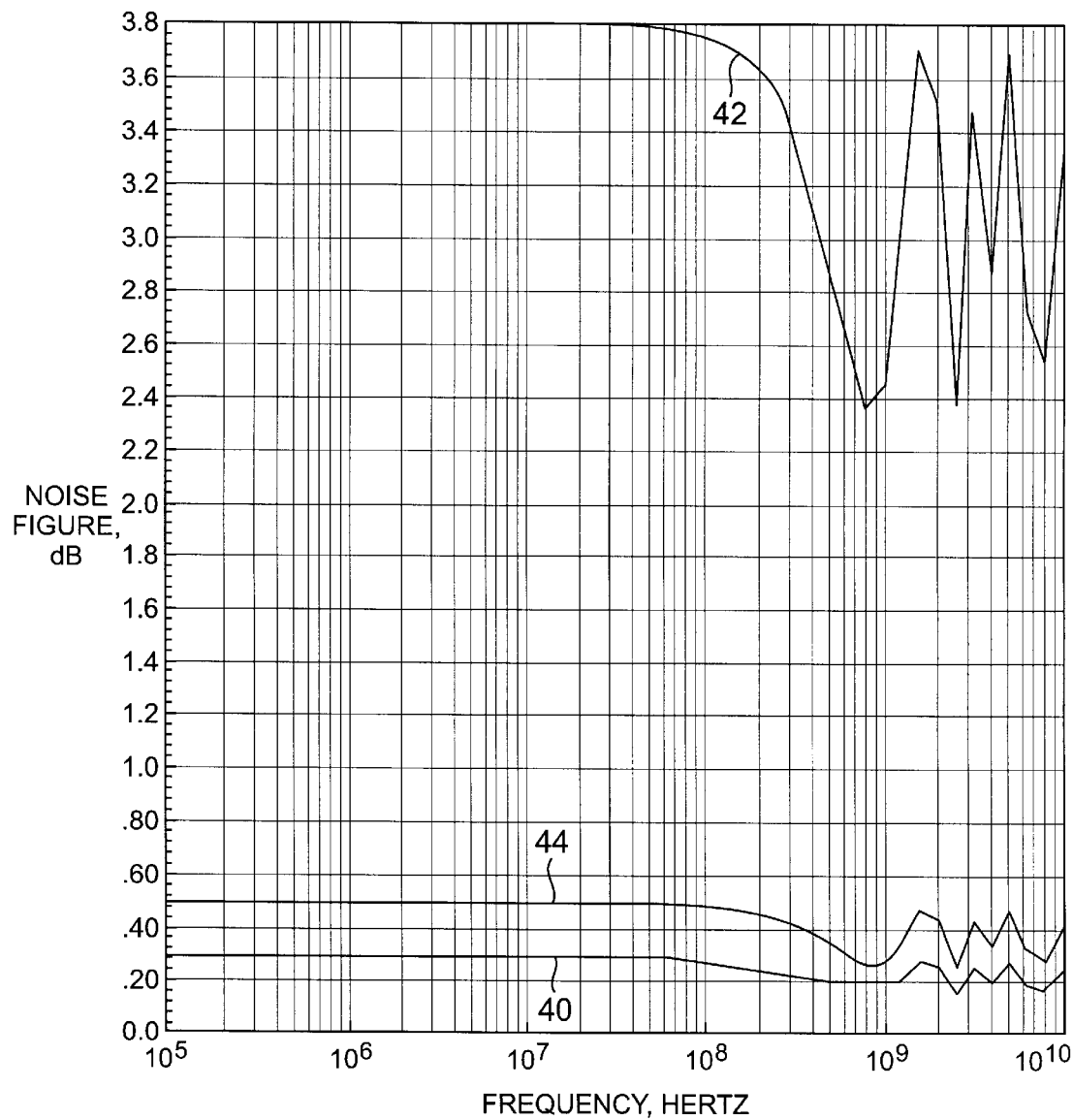
FIG. 6 is a graph showing the relationship of the preamplifier noise figure with frequency for two prior art types of preamplifier systems and for the preamplifier system of the present invention.

FIG. 6 is a graph showing the relationship of the preamplifier noise figure with frequency for two prior art types of preamplifier systems and for the preamplifier system of the present invention. Curve 40 illustrates the preamplifier noise figure to frequency relationship for a prior art preamplifier system that is not impedance matched to the interconnect, as generally shown in FIG. 2A. Curve 42 illustrates the preamplifier noise figure to frequency relationship for a prior art preamplifier system employing a shunt matching resistor for impedance matching to the interconnect, as generally shown in FIG. 2B. Curve 44 illustrates the preamplifier noise figure to frequency relationship for the impedance matched feedback terminated preamplifier system of the present invention, as generally shown in FIG. 2C. Noise figure is another quantity well known in the art for measuring the performance of amplifiers, and represents the difference between the input signal-to-noise ratio (SNR) of the preamplifier and the output SNR of the preamplifier. It can therefore be appreciated that the noise figure of the preamplifier describes how much noise is added to the entire read system by the preamplifier. The baseline noise figure of a preamplifier system is shown by curve 40, which employs no additional components to impedance match the preamplifier to the interconnect. Employing a shunt matching resistor to impedance-match the preamplifier to the interconnect, as shown by curve 42, increases the noise figure over the passband of frequencies (up to about 1 GHz in a typical embodiment) by over 3 dB, raising the total noise figure to a level which is typically an unacceptable level of noise for high performance disk drives. For example, a total noise figure of about 1.0–2.0 dB is acceptable for a typical disk drive system employing a GMR head, and a total noise figure of about 2.0–3.0 dB is acceptable for a typical disk drive system employing a TMR head. It will be understood by one skilled in the art that a noise figure increase of 3.0 dB attributable only to the impedance matching shunt resistor would result in a total noise figure in these systems that exceeds the acceptable levels. By contrast, impedance matching the preamplifier to the interconnect with negative feedback in the manner of the present invention, as shown by curve 34, results in only a modest increase in the noise figure of the preamplifier system, well within acceptable levels for high performance disk drive systems.

The graphs of FIGS. 4–6 show that the feedback terminated impedance matched preamplifier system of the present invention achieves the advantages of impedance matching (increasing the effective bandwidth of the preamplifier system) while maintaining a level of noise performance that is similar to non-impedance matched preamplifiers, acceptable for high performance disk drive applications. The present invention is able to achieve this level of performance with only the addition of simple components (resistors, bipolar junction transistors (BJTs) and capacitors), providing both an efficient and cost-effective preamplifier system for implementation in disk drives.

The present invention also provides a superior high bandwidth, low noise preamplifier system for disk drive applications that utilize either a short interconnect or no interconnect at all. Despite the fact that precise impedance matching cannot occur between the preamplifier system and the MR head in such systems, the preamplifier circuit of the present invention achieves extremely good performance, particularly when the resistance of the MR head is greater than about 80Ω.

Mathematical Analysis

In order to more thoroughly explain the bandwidth and noise performance of preamplifier system 11 of the present invention, a mathematical analysis may be performed. For the purposes of the mathematical analysis it should be assumed that preamplifier system 13, shown in FIG. 1, is connected to read head 12 with approximately two inches of interconnect. Interconnect 12 is commonly 100 Ohms ($\Omega$) differential impedance ($Z_{DIFF}$) and 30$\Omega$ common-mode impedance ($Z_{CM}$) and 250 psec propagation delay time ($\tau$). Read head 12 typically has a resistance between 30 and 80$\Omega$ for GMR heads.

1. Input-Referred Noise Calculations

In evaluating a reader architecture, one must determine the input-referred noise of each significant noise-component. Ultimately, one is interested in the signal-to-noise ratio (SNR) of the amplifier.

$$SNR \equiv 20 \log \left( \frac{V_{SIGNAL}}{V_{NOISE}^{INPUT-REFERRED}} \right) \quad \text{(Eq. 2)}$$

The amplitude of the signal from the MR element, though, is typically not available during the development stages of the preamplifier. Referring each noise-source to the input allows for comparative analyses of different architectures. It is here at the input that the signal is introduced, and this signal is independent of preamplifier architecture at this location. If one knows the amplitude of the preamplifier noise referred to this point, the signal-to-noise can be easily computed once the signal amplitude is known. More importantly, one can compare the noise amplitudes of different architectures when using input referred numbers. The difference of the signal-to-noise ratios of two different architectures is:

$$\Delta SNR = 20 \log \left( \frac{V_{NOISE}^{INPUT-REFERRED}(\text{architecture \#1})}{V_{NOISE}^{INPUT-REFERRED}(\text{architecture \#2})} \right) \quad \text{(Eq. 3)}$$

It should be noted that the signal amplitude does not need to be known when comparing the SNR of two architectures.

2. Effects of Interconnect and MR Resistance on Response

The input system or input network, which includes the MR transducer, the interconnect between the preamplifier and this sensor, and the preamplifier, is the single most sensitive system in the entire read path. Here, the signal that the sensor generates is quite small (typically about 1 mV for today's production giant magnetoresistive (GMR) transducers). Any noise produced here or coupled into this system will be amplified by the full gain that is used for signal amplification. Since this system is typically not impedance-matched, the response to the signal is not constant over frequency. The signal transfer from the MR transducer to the preamplifier input is described by the following transfer function:

$$A_V^{IN} \equiv \frac{V_{PA}}{V_{MR}} \quad \text{(Eq. 4)}$$

$$= \frac{R_{PA} Z_{TL}}{Z_{TL}(R_{PA} + R_{MR})\cos\omega\tau + j(R_{PA}R_{MR} + Z_{TL}^2)\sin\omega\tau}$$

The gain $A_V^{IN}$ is a periodic function of frequency ($\omega$). The gain periodicity is solely determined by the interconnect propagation time and is independent of $R_{PA}$ and $R_{MR}$. In other words, the periodicity for a current-sense preamplifier is the same as that of a voltage-sense preamplifier.

At DC ($\omega=0$) and at frequencies at which $\omega\tau$ equals an integral multiple of $\pi$, the gain is given by:

$$A_V^{IN}\left(\omega = \frac{N\pi}{\tau}\right) = \pm \frac{R_{PA}}{R_{PA} + R_{MR}} \quad \text{(Eq. 5)}$$

At frequencies at which $\omega\tau$ equals $(N+\frac{1}{2})\pi$.

$$A_V^{IN}\left(\omega = \frac{(N+1/2)\pi}{\tau}\right) = \pm \frac{R_{PA}Z_{TL}}{j(R_{PA}R_{MR} + Z_{TL}^2)} \quad \text{(Eq. 6)}$$

The ratio of (Eq. 6) to (Eq. 5) gives the ratio of the extrema ($F_{AV}$):

$$F_{AV} \equiv \frac{A_V^{IN}\left(\omega = \frac{(N+1/2)\pi}{\tau}\right)}{A_V^{IN}\left(\omega = \frac{N\pi}{\tau}\right)} = \pm \frac{Z_{TL}(R_{PA} + R_{MR})}{j(R_{PA}R_{MR} + Z_{TL}^2)} \quad \text{(Eq. 7)}$$

The magnitude of this ratio ($F_{AV}$) is unity for all frequencies for an impedance-matched system ($R_{MR}=Z_{TL}$ or $R_{PA}=Z_{TL}$). Furthermore, the ratio for a voltage-sense preamplifier ($R_{PA}>Z_{TL}$) is equal to the inverse ratio of a current-sense preamplifier ($R_{PA}>Z_{TL}$) if:

$$R_{PA} = (\text{current} - \text{sense}) = \frac{R_{PA}(\text{voltage} - \text{sense})}{Z_{TL}^2} \quad \text{(Eq. 8)}$$

This simply means that the magnitude of the gain variation is equal for the two schemes if the input-impedances of the two schemes are equivalently mismatched from the interconnect. For example, if the interconnect differential impedance is 100 ohms, a 1000 ohm voltage-sense preamplifier and a 10 ohm current-sense preamplifier have the same magnitude of gain variation. The voltage-sense response will show peaking, and the current-sense response will show attenuation. In the voltage-sense limit of $R_{PA}$ approaching infinity, the gain ratio ($F_{AV}$) approaches the value given by:

$$F_{AV} = \pm \frac{jZ_{TL}}{R_{MR}} \quad \text{(Eq. 9)}$$

For the current-sense limit of $R_{PA}$ approaching zero, the gain ratio ($F_{AV}$) approaches the value given by:

$$F_{AV} = \pm \frac{jR_{MR}}{Z_{TL}} \quad \text{(Eq. 10)}$$

3. Response of Terminated Systems

If one uses a preamplifier that is impedance-matched to the transmission line, then:

$$R_{PA}=Z_{TL} \quad \text{(Eq. 11)}$$

For such an equality, the response of the system becomes:

$$A_V^{IN} = \frac{R_{PA}}{R_{PA} + R_{MR}} e^{-j\omega\tau} \quad \text{(Eq. 12)}$$

Here, the exponent simply represents the delay of the transmission line and is not problematic. Note that the magnitude of the response is frequency independent. It is also important to recognize that this response can be obtained by any preamplifier whose input impedance is equal to the differential impedance of the transmission line regardless of the method used to determine $R_{PA}$.

4. Noise Decomposition

A method often used for noise calculations is to decompose the noise sources of an amplifier into two components: current-noise and voltage-noise. When these noise components are modeled, the voltage-noise component is in series with the input of the amplifier while the current-noise component is across the amplifier's inputs. The preamplifier's input-impedance is in parallel with the current-noise component, and that the voltage-noise component is between the preamplifier and its input-impedance element. This decomposition is appropriate for typical disk-drive preamplifiers, if one notes that the two components can be partially correlated. Typically, current-sense architectures have a strong correlation between the current-noise and voltage-noise components, while voltage-sense preamplifiers have weak correlation.

This decomposition uses an amplifier that has an infinite input-impedance. $R_{PA}$ represents the input-impedance of the actual amplifier that is being modeled. This resistor is noiseless, as the noise due to this resistor is included in the current-noise component of the decomposition.

5. Noise Implications of Input Network

Input referring the two noise components results in frequency dependencies because of the impedance-mismatched input network. Here, it will be shown that the two components have frequency responses that are different from one another. Typically, one noise component has a frequency response that peaks at resonance, while the other is attenuated at resonance. To solve for the input-referred equivalent noise as a function of frequency, one needs to find the input network's impedance as a function of frequency. The equivalent impedance $Z_{EQ}$ of the input network as seen from the preamplifier is given by:

$$Z_{EQ} = Z_{TL} \frac{R_{MR}\cos\omega\tau + jZ_{TL}\sin\omega\tau}{Z_{TL}\cos\omega\tau + jR_{MR}\sin\omega\tau} \quad \text{(Eq. 13)}$$

If a current-noise source is applied across the inputs of the preamplifier and input-referred voltage-noise associated with this source is evaluated, the following is obtained:

$$V_I^{input-referred} = I_N^{preamp} \frac{R_{PA}Z_{EQ}}{R_{PA}+Z_{EQ}} \frac{1}{A_V^{IN}} \quad \text{(Eq. 14)}$$

If (Eq. 14) is solved using (Eq. 4) and (Eq. 13), the input-referred voltage-noise of the preamplifier's equivalent current-noise becomes:

$$V_I^{input-referred} = I_N^{preamp}(R_{MR}\cos\omega\tau + jZ_{TL}\sin\omega\tau) \quad \text{(Eq. 15)}$$

For a system whose preamplifier is impedance-matched to the interconnect, no change to the current-noise component results.

If a voltage-noise source is now applied in series with the input of the preamplifier and evaluates the input-referred voltage-noise associated with this source, the following is obtained:

$$V_V^{input-referred} = \frac{V_N^{preamp}}{A_V^{IN}} \quad \text{(Eq. 16)}$$

If (Eq. 4) and (Eq. 13) are now applied to (Eq. 16), the input-referred voltage-noise associated with the preamplifier's equivalent voltage-noise component becomes:

$$V_V^{input-referred} = \quad \text{(Eq. 17)}$$
$$\frac{V_N^{preamp}}{R_{PA}Z_{TL}}[Z_{TL}(R_{PA}+R_{MR})\cos\omega\tau + j(R_{PA}R_{MR}+Z_{TL}^2)\sin\omega\tau]$$

For systems in which the preamplifier is not impedance-matched to the interconnect (typical prior art current-sense and voltage-sense architectures), as one noise component increases, the other decreases. If the two noise components are mostly uncorrelated, the two components add as the square root of the sum of squares. Even though one noise component is reduced at resonance, the total system noise is typically increased at resonance because of the lack of correlation. This noise peaking is often the dominant source of high frequency noise.

For systems in which the preamplifier is impedance-matched to the interconnect, the input-referred voltage-noise associated with the preamplifier's equivalent voltage-noise component becomes frequency independent.

$$V_V^{input-referred} = V_N^{preamp} \frac{R_{PA}+R_{MR}}{R_{PA}} e^{j\omega\tau} \quad \text{(Eq. 18)}$$

Furthermore, the form of the input-referred noise is the same as that of the DC term of the impedance mismatched system (Eq. 17).

6. Input Referred Noise of the Simply Terminated System

To determine whether or not a new architecture has increased noise, the input-referred noise of both the voltage-sense and current-sense components needs to be examined. Here we will compare a simple (shunt) impedance-matched preamplifier (FIG. 2B) and an impedance-matched reader using feedback (FIG. 2C) with an amplifier that is not impedance-matched (FIG. 2A). Although both impedance matching methods have an improved response over the non-impedance-matched architecture, their input-referred noise components are quite different.

In the shunt matched preamplifier system, current noise associated with the termination resistor is in parallel with the input, similar to the current-noise of the amplifier. Thus, the noise associated with the termination resistor adds to the current-noise component of the preamplifier. Since this additional noise is uncorrelated to the other current-noise of the preamplifier, the terms would add in an uncorrelated fashion.

$$I_N^{preamp} = \sqrt{(I_N^{amplifier})^2 + (I_N^{termination})^2} \quad \text{(Eq. 19)}$$

This addition to the noise is typically very significant. The current-noise of a voltage-sense amplifier is typically about equal to the current noise associated with a 400Ω resistor across the input terminals. Since, the differential impedance of a typical input network interconnect is around 100Ω, the noise associated with this simple termination scheme is very large. In fact the noise of the termination resistor becomes the dominant current-noise component of the amplifier.

The voltage-noise component of the simple (shunt) impedance-matched architecture is also greater than the non-impedance-matched preamplifier. This can be seen by comparing the input-referred voltage-noise components of the two architectures. Although at low frequencies, the forms of the input-referred voltage-noise components are the same for the two systems, the magnitude of the preamplifier's input-impedance is very different. We will approximate the voltage-sense amplifier as having an input-impedance that is very large. The input-referred noise of the preamplifier's voltage-noise component (Eq. 17) then becomes:

$$V_V^{input\text{-}referred} = V_N^{preamp}\left(\cos\omega\tau + j\frac{R_{MR}}{Z_{TL}}\sin\omega\tau\right) \quad \text{(Eq. 20)}$$

At DC, the magnitude of the input-referred voltage noise of the simply terminated system is larger than that of the unterminated system by a factor of:

$$\frac{V_{V\_SIMPLY\text{-}TERMINATED}^{input\text{-}referred}}{V_{V\_UNTERMINATED}^{input\text{-}referred}} = \frac{R_{PA}^{SIMPLY\text{-}TERMINATED} + R_{MR}}{R_{PA}^{SIMPLY\text{-}TERMINATED}} \quad \text{(Eq. 21)}$$

At resonance, this ratio becomes:

$$\frac{V_{V\_SIMPLY\text{-}TERMINATED}^{input\text{-}referred}}{V_{V\_UNTERMINATED}^{input\text{-}referred}} = \frac{R_{PA}^{SIMPLY\text{-}TERMINATED} + R_{MR}}{R_{PA}^{SIMPLY\text{-}TERMINATED}} \frac{Z_{TL}}{R_{MR}} \quad \text{(Eq. 22)}$$

Thus at DC the input-referred voltage noise of the simply terminated system is greater than the unterminated system, and for typical system parameters, this is likewise true at resonance. This is simply due to the reduced gain of the input network. This increased voltage noise is in addition to the increased current noise due to the noise of the termination resistor itself.

7. Input-Referred Noise of the Feedback-Terminated System

For the feedback-terminated preamplifier system, the current noise of the system is increased by the addition of the termination resistors. Here, because of the gain of the preamplifier, large value resistors can be used. The value of the resistor used is determined by the Miller equation:

$$R_{FB} = (1 + A_V^{PA})Z_{TL} = (1 + A_V^{PA})R_{PA}^{EFFECTIVE} \quad \text{(Eq. 23)}$$

The equation for the input-referred value of the current-noise is the same for the unterminated system. Thus the increase in the current-noise is simply that current-noise associated with the feedback resistor:

$$\frac{I_N}{\Delta f} = \sqrt{\frac{4kT}{R_{FB}}} = \sqrt{\frac{4kT}{Z_{TL}(1+A_V^{PA})}} \quad \text{(Eq. 24)}$$

By increasing the gain of the preamplifier, this noise term can be made arbitrarily small. Thus the increase in the current-noise of the feedback-terminated preamplifier is only modestly greater than that of the unterminated system.

The voltage-noise of the preamplifier is likewise only modestly increased in the feedback-terminated system as will now be shown. Here, the voltage noise of the preamplifier is partially canceled due to the feedback of the system. The voltage-noise that appears across the inputs of the preamplifier generates a voltage at the output of the preamplifier that is given by:

$$V_{N\_OUTPUT}^{PA} = V_{N\_INPUT}^{PA} A_V^{PA} \quad \text{(Eq. 25)}$$

This voltage generates a signal across the transmission-line terminals at the preamplifier side of the interconnect:

$$V_{N\_TL}^{PA} = -V_{N\_OUTPUT}^{PA}\frac{Z_{EQ}}{Z_{EQ}+R_{FB}} \quad \text{(Eq. 26)}$$

$$= -V_{N\_INPUT}^{PA} A_V^{PA}\frac{Z_{EQ}}{Z_{EQ}+R_{FB}}$$

This noise then adds to the noise voltage that is explicitly given (the voltage-noise of the preamplifier—$V_N$):

$$V_{N\_INPUT}^{PA} = V_N + V_{N\_TL}^{PA} \quad \text{(Eq. 27)}$$

$$= V_N - V_{N\_INPUT}^{PA} A_V^{PA}\frac{Z_{EQ}}{Z_{EQ}+R_{FB}}$$

Solving for the voltage that appears across the input terminals of the preamplifier yields:

$$V_{N\_INPUT}^{PA} = V_N\frac{Z_{EQ}+R_{FB}}{(1+A_V^{PA})Z_{EQ}+R_{FB}} \quad \text{(Eq. 28)}$$

Substituting (Eq. 23) into (Eq. 28) gives:

$$V_{N\_INPUT}^{PA} = V_N\frac{\frac{Z_{EQ}}{1+A_V^{PA}}+Z_{TL}}{Z_{EQ}+Z_{TL}} = V_N\frac{\frac{Z_{EQ}}{1+A_V^{PA}}+R_{PA}^{EFFECTIVE}}{Z_{EQ}+R_{PA}^{EFFECTIVE}} \quad \text{(Eq. 29)}$$

The noise that appears across the input of the preamplifier is smaller than the voltage-noise of the preamplifier by a factor that is approximately equal to the gain of the input network. Input-referring this noise results in:

$$V_V^{input\text{-}referred} = V_N^{preamp}\frac{\left(R_{PA}^{EFFECTIVE}+\frac{R_{MR}}{1+A_V^{PA}}\right)\cos\omega\tau + j\left(R_{MR}+\frac{R_{PA}^{EFFECTIVE}}{1+A_V^{PA}}\right)\sin\omega\tau}{R_{PA}^{EFFECTIVE}} \quad \text{(Eq. 30)}$$

For large preamplifier gain, this can be approximated as:

$$V_V^{input\text{-}referred} = V_N^{preamp}\left(\cos\omega\tau + j\frac{R_{MR}}{R_{PA}^{EFFECTIVE}}\sin\omega\tau\right) \quad \text{(Eq. 31)}$$

Comparing this to (Eq. 20) shows that the input-referred voltage-noise of the feedback-terminated system is approximately equal to the unterminated system. The approximation is valid for preamplifiers with high gain. By high gain, what is meant is a gain that reduces the secondary noise terms in (Eq. 30) to values that are much smaller than the terms that are gain independent. A preamplifier gain of ten is a practical minimum preamplifier gain to reduce the gain dependent noise terms to very modest levels.

It can be noted that because impedance-matched preamplifiers have smaller input-networks gains than their unterminated counterparts, that the noise of the subsequent amplifier stages will increase the voltage-noise of the preamplifier. While this is true, all that is needed to keep the noise of the second stage to an insignificant level is a first stage gain of ten or more. Because preamplifiers currently are not silicon bandwidth limited, designing the preamplifier to have sufficient first stage gain is not problematic.

8. Summary

The need for input network parameter consideration is a new necessity for preamplifier designs. Until reader bandwidth requirements became a large fraction of the input network resonant frequency (¼τ or 1 GHz typically), the preceding high frequency issues were unimportant. Now that the bandwidths are high relative to the input network resonant frequency, the input network parameters have significant effect on the system performance. The following simplified statements may be observed with respect to impedance matching of the preamplifier system:

(a) The response of the input network is not constant for a mismatched system. This response can be made flat by using an impedance-matched preamplifier.

(b) The noise penalty of using a simple termination scheme is significant.

(c) The noise penalty can be made negligible using a feedback method of generating an impedance-matched preamplifier. The noise of the feedback-matched preamplifier is approximately identical to its unterminated counterpart.

(d) The input-referred current-noise of the feedback amplifier is only modestly greater than that of the unterminated preamplifier. This is because the feedback resistor can be made quite large due to the gain of the amplifier.

(e) The input-referred voltage-noise of the feedback amplifier is again only modestly greater than that of the unterminated preamplifier. In this case, this is due to the cancellation of the noise due to the feedback. The cancellation of the noise is approximately equal to the amount of gain degradation of the input network due to impedance-matching.

Although an exemplary embodiment of the present invention is shown using npn bipolar transistor technology, the present invention may also be practiced using pnp bipolar and FET technologies, or any other comparable switching devices. In addition, while the invention is described in the form of discrete devices, it is recognized that the circuit is preferably reduced to practice in the form of an integrated circuit (IC). Therefore, terms such as "device" and the like should be construed in their broadest contexts to include portions of IC's that are conveniently described as functional components, as well as discrete devices. Workers skilled in the art will recognize that changes may be made in form and detail without departing from the spirit and scope of the invention.

What is claimed is:

1. A preamplifier system for connection through an interconnect to a read head, the interconnect having a characteristic impedance, the preamplifier system comprising:
    an amplifier circuit having an input for connection to the interconnect to amplify an input signal carried from the read head through the interconnect to yield an amplified output signal; and
    a feedback resistance connected between the amplified output signal and the input of the amplifier circuit, the feedback resistance having a value selected to provide an effective input impedance of the preamplifier system to match the characteristic impedance of the interconnect.

2. The preamplifier system of claim 1, wherein the amplified output signal is undistorted up to a frequency of about 1 giga-Hertz (GHz).

3. The preamplifier system of claim 1, wherein a noise figure of the preamplifier system is no greater than about 2.0 dB where the read head comprises a giant magnetoresistive (GMR) element.

4. The preamplifier system of claim 1, wherein a noise figure of the preamplifier system is no greater than about 3.0 dB where the read head comprises a tunneling magnetoresistive (TMR) element.

5. The preamplifier system of claim 1, wherein the amplifier circuit includes a first portion connected in a common emitter configuration with degeneration and a second portion connected in a common base configuration.

6. The preamplifier system of claim 1, wherein the amplifier circuit includes a first differential transistor pair and a second differential transistor pair connected by an AC coupling capacitor.

7. The preamplifier system of claim 1, wherein the amplifier circuit and the feedback resistance are implemented in an integrated circuit.

8. A disk drive having a read system supported by an arm over a surface of a rotatable disk, the read system comprising:
    a read head;
    an interconnect having a characteristic impedance, having first and second inputs connected to opposite sides of the read head and having first and second outputs; and
    a preamplifier system operatively connected to the first and second outputs of the interconnect, the preamplifier system comprising:
        an amplifier circuit connected to amplify an input signal between the first and second outputs of the interconnect to yield an amplified output signal between first and second amplifier outputs;
        a first feedback resistor connected between the first amplifier output and the first output of the interconnect; and
        a second feedback resistor connected between the second amplifier output and the second output of the interconnect, the first and second feedback resistors having values selected to provide an effective input impedance of the preamplifier system to match the characteristic impedance of the interconnect.

9. The disk drive of claim 8, wherein the amplified output signal is undistorted up to a frequency of about 1 giga-Hertz (GHz).

10. The disk drive of claim 8, wherein the read head comprises a GMR element and a noise figure of the preamplifier system is no greater than about 2.0 dB.

11. The disk drive of claim 8, wherein the read head comprises a TMR element and a noise figure of the preamplifier system is no greater than about 3.0 dB.

12. The disk drive of claim 8, wherein the amplifier circuit includes a first portion connected in a common emitter configuration with degeneration and a second portion connected in a common base configuration.

13. The disk drive of claim 8, wherein the amplifier circuit includes a first differential transistor pair and a second differential transistor pair connected by an AC coupling capacitor.

14. The disk drive of claim 8, wherein the amplifier circuit and the first and second feedback resistors are implemented in an integrated circuit.

15. A preamplifier system for connection through an interconnect to a read head, the interconnect having a characteristic impedance, first and second inputs connected to opposite sides of the read head and first and second outputs, the preamplifier system comprising:

an amplifier circuit having first and second amplifier inputs for respective connection to the first and second outputs of the interconnect to amplify an input signal between the first and second outputs of the interconnect to yield an amplified output signal between first and second amplifier outputs;

a first feedback resistor connected between the first amplifier output and the first amplifier input; and a second feedback resistor connected between the second amplifier output and the second amplifier input, the first and second feedback resistors having values selected to provide an effective input impedance of the preamplifier system to match the characteristic impedance of the interconnect.

16. The preamplifier system of claim 15, wherein the amplified output signal is undistorted up to a frequency of about 1 giga-Hertz (GHz).

17. The preamplifier system of claim 15, wherein a noise figure of the preamplifier system is no greater than about 2.0 dB where the read head comprises a GMR element.

18. The preamplifier system of claim 15, wherein a noise figure of the preamplifier system is no greater than about 3.0 dB where the read head comprises a TMR element.

19. The preamplifier system of claim 15, wherein the amplifier circuit includes a first portion connected in a common emitter configuration with degeneration and a second portion connected in a common base configuration.

20. The preamplifier system of claim 15, wherein the amplifier circuit includes a first differential transistor pair and a second differential transistor pair connected by an AC coupling capacitor.

21. The preamplifier system of claim 15, wherein the amplifier circuit and the first and second feedback resistors are implemented in an integrated circuit.

22. A preamplifier system for coupling to a read head having first and second terminals, the preamplifier system comprising:

an amplifier circuit having first and second amplifier inputs for respective connection to the first and second terminals of the read head to amplify a signal from the read head and yield an amplified output signal between first and second amplifier outputs;

a first feedback resistor connected between the first amplifier output and the first amplifier input; and a second feedback resistor connected between the second amplifier output and the second amplifier input.

23. The preamplifier system of claim 22, wherein the amplifier circuit includes a first portion connected in a common emitter configuration with degeneration and a second portion connected in a common base configuration.

24. The preamplifier system of claim 22, wherein the amplifier circuit includes a first differential transistor pair and a second differential transistor pair connected by an AC coupling capacitor.

25. The preamplifier system of claim 22, wherein the amplifier circuit and the first and second feedback resistors are implemented in an integrated circuit.

* * * * *